United States Patent
Jussli et al.

(10) Patent No.: US 10,625,863 B2
(45) Date of Patent: Apr. 21, 2020

(54) SEATING DEVICE

(71) Applicant: RECARO Aircraft Seating GmbH & Co. KG, Schwaebisch Hall (DE)

(72) Inventors: Zoltan Jussli, Bretzfeld (DE); Jens Jakubowski, Schwaebisch Gmuend (DE); Michael Horlacher, Schwaebisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 15/764,435

(22) PCT Filed: Sep. 29, 2016

(86) PCT No.: PCT/EP2016/073217
§ 371 (c)(1),
(2) Date: Mar. 29, 2018

(87) PCT Pub. No.: WO2017/055417
PCT Pub. Date: Apr. 6, 2017

(65) Prior Publication Data
US 2018/0290752 A1    Oct. 11, 2018

(30) Foreign Application Priority Data

Sep. 30, 2015   (DE) .......................... 10 2015 116 593

(51) Int. Cl.
*B64D 11/06*   (2006.01)
(52) U.S. Cl.
CPC ...... *B64D 11/0631* (2014.12); *B64D 11/0627* (2014.12); *B64D 11/0629* (2014.12); *B64D 11/0648* (2014.12); *Y02T 50/46* (2013.01)

(58) Field of Classification Search
CPC ............ B64D 11/0631; B64D 11/0627; B64D 11/0628; B64D 11/0629; Y02T 50/46; A47C 7/622; A47C 7/626
USPC .......................... 297/188.13, 188.08, 188.21
See application file for complete search history.

(56) References Cited

U.S. PATENT DOCUMENTS

| 3,154,345 | A |   | 10/1964 | Lambrecht |
| 3,516,098 | A |   | 6/1970  | O'Link |
| 3,623,683 | A | * | 11/1971 | Bennett ................. B64D 11/00 244/122 A |
| 3,903,554 | A |   | 9/1975  | Dodd |
| 4,306,748 | A |   | 12/1981 | Sullivan |
| 5,485,976 | A |   | 1/1996  | Creed et al. |

(Continued)

FOREIGN PATENT DOCUMENTS

DE    10008258 A1    9/2001
GB    2026853 A      2/1980

OTHER PUBLICATIONS

German Search Report dated Jul. 26, 2016 issued in corresponding DE patent application No. 10 2015 116 593.7 (and partial English translation).

(Continued)

*Primary Examiner* — Mark R Wendell
(74) *Attorney, Agent, or Firm* — Posz Law Group, PLC

(57) ABSTRACT

A seating device comprises a seat bottom unit, in particular an aircraft seat bottom unit, having an accommodating region for receiving a module, in particular a lifejacket module, with at least one upper wall element which forms at least a support surface for a comfort element.

14 Claims, 3 Drawing Sheets

(56) References Cited

U.S. PATENT DOCUMENTS

Figure 1:
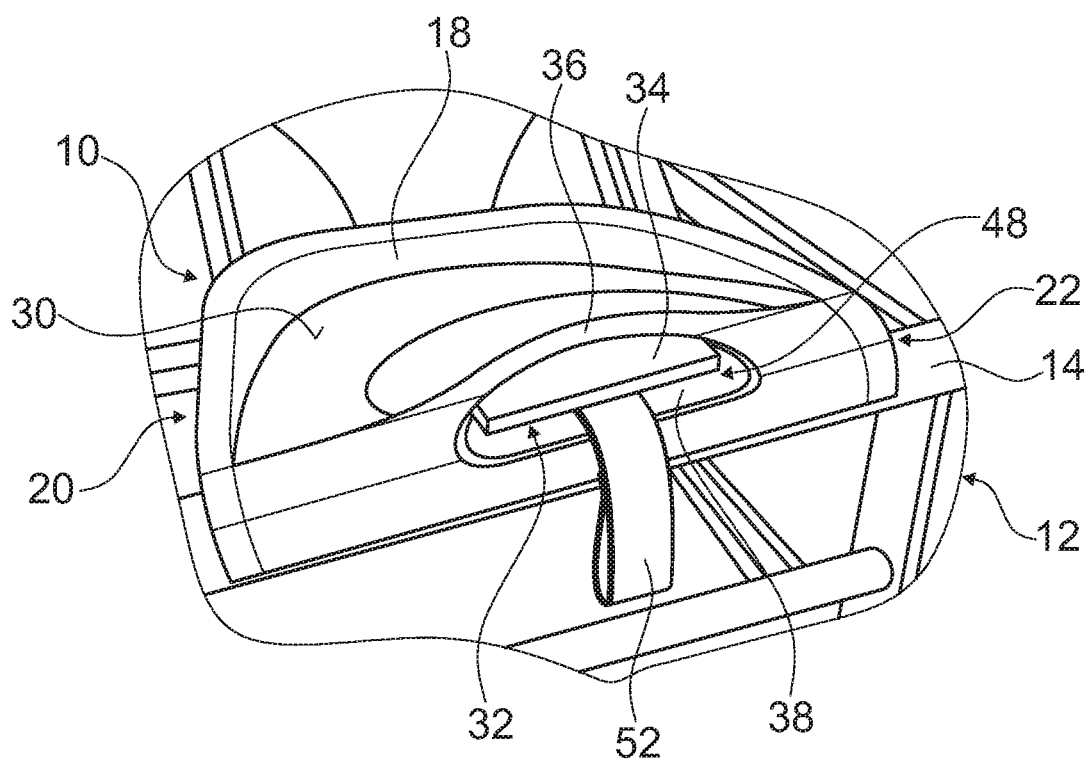

| | | | | |
|---|---|---|---|---|
| 5,692,335 | A | 12/1997 | Magnuson | |
| 7,008,013 | B2* | 3/2006 | Okamoto | B60N 3/102 |
| | | | | 297/188.11 |
| 7,530,631 | B2* | 5/2009 | Skelly | B60N 2/62 |
| | | | | 297/188.08 |
| 8,094,041 | B2* | 1/2012 | Wentland | B64D 11/0624 |
| | | | | 244/117 R |
| 2005/0062319 | A1* | 3/2005 | Hough | B63C 9/22 |
| | | | | 297/188.08 |
| 2005/0104422 | A1 | 5/2005 | Okamoto | |
| 2007/0015422 | A1* | 1/2007 | Everhart | B64D 11/06 |
| | | | | 441/80 |
| 2008/0106127 | A1* | 5/2008 | Hough | B64D 11/06 |
| | | | | 297/188.08 |
| 2009/0242695 | A1 | 10/2009 | Lamoree et al. | |
| 2012/0049559 | A1 | 3/2012 | Whitman | |
| 2015/0034641 | A1* | 2/2015 | Aruga | B64D 11/0631 |
| | | | | 220/214 |

OTHER PUBLICATIONS

International Search Report dated Dec. 20, 2016 issued in corresponding International patent application No. PCT/EP2016/073217.
International Preliminary Report on Patentability dated Apr. 3, 2018 issued in corresponding International patent application No. PCT/EP2016/073217.
Office Action dated Aug. 23, 2019 issued in corresponding EP patent application No. 16 777 960.2-1010 (and English translation).

\* cited by examiner

Schnitt XI - XI

SEATING DEVICE

CROSS REFERENCE TO RELATED APPLICATIONS

This application is a U.S. national stage application of PCT/EP2016/073217 filed on Sep. 29, 2016, which is based on German Patent Application No. 10 2015 116 593.7 filed on Sep. 30, 2015, the contents of which are incorporated herein by reference.

PRIOR ART

The invention relates to a seating device according to the preamble of patent claim 1. A seating device comprising a seat bottom unit, in particular an aircraft seat bottom unit, has already been proposed.

The object of the invention consists in particular of providing a device of the type in question with improved properties in respect of compactness. The object is achieved according to the invention by the features of patent claim 1, while advantageous refinements and developments of the invention can be gathered from the dependent claims.

Advantages of the Invention

The invention is based on a seating device comprising a seat bottom unit, in particular an aircraft seat bottom unit.

It is proposed that the seat bottom unit has an accommodating region for receiving a module, in particular a lifejacket module, with at least one upper wall element which forms at least a support surface for a comfort element. A "seat bottom unit" is intended to be understood here as meaning in particular a seat bottom unit of an aircraft seat, wherein the seat bottom unit forms at least one supporting basic structure of the aircraft seat, transmits the forces during use, in particular the forces which are introduced into the aircraft seat by a passenger sitting on the aircraft seat, to a mounting unit, via which the forces are then dissipated into a floor, in particular into a cabin floor. The seat bottom unit is connected directly or indirectly here to the mounting unit of the aircraft seat. An "aircraft seat" is intended to be understood here as meaning a seat, in particular a flight passenger seat, which is configured to be mounted via its mounting unit in an aircraft cabin and to provide a seat for a passenger, in particular during a flight. The aircraft seat is configured here in particular to be brought into at least two different positions, wherein the aircraft seat is preferably adjustable in particular between a sitting position and a comfort position. During an adjustment of the aircraft seat between its at least two positions, the seat bottom and/or a back rest are preferably pivoted relative to the mounting unit and/or with respect to each other here. An "accommodating region" is intended to be understood here as meaning in particular an at least partially separated region in which an element, in particular a module, can be arranged for transport, wherein a module which is arranged in the accommodating region is at least partially, preferably substantially completely, arranged here within the accommodating region. The accommodating region spans a volume in which the element or module to be transported or stowed is arranged. A "lifejacket module" is intended to be understood here as meaning in particular a module which comprises at least one lifejacket which is intended for a passenger, in particular in an emergency, and which can be reached by the passenger from his aircraft seat, in particular while seated. The lifejacket module here preferably has a container in which the lifejacket is securely stored, and a pulling element which can be guided into a position which is easily reachable for the passenger, and therefore the passenger can pull the lifejacket module toward him/her via the pulling element. "Configured" is intended to be understood here as meaning in particular specially designed and/or equipped. By an object being configured for a specific function is intended to be understood as meaning in particular that the object carries out and/or implements said certain function in at least one use and/or operating state. Herein a "support surface" is in particular to mean a surface which is configured in such a way that an element, such as in particular a comfort element, preferably lies flat upon it. Forces which are introduced into the aircraft seat via the comfort element are introduced from the comfort element into the seat bottom unit via the support surface here. A "comfort element" is intended to be understood here as meaning in particular an element which forms the seat region for the passenger and in particular forms an exchangeable and/or upholstered underlying surface here. The comfort element here preferably has a cover which surrounds the seat region, wherein the cover here can be implemented, for example, from a textile, a leather or another material appearing expedient to a person skilled in the art. The comfort element preferably has a cushion which can be implemented, for example, from a flexible foam, wherein the cushion here is preferably surrounded by the cover. In principle, it is also conceivable for the cover to be implemented integrally with the cushion, or else for the comfort element not to have a cushion or a cover. In this way the seat bottom unit may be realized in a particularly advantageous manner. By means of an implementation according to the invention, a module, in particular a lifejacket module, may be integrated particularly simply and advantageously in a seating device and, as a result, a particularly advantageous seat, in particular a particularly advantageous aircraft seat, can be made available.

Furthermore, it is proposed that the seat bottom unit has at least one lower wall element which downwardly delimits the accommodating region. A "lower wall element" is intended to be understood here as meaning in particular an element which delimits the accommodating region and delimits the accommodating region in particular downward in the direction of a mounting plane. The lower wall element can be implemented here integrally with the upper wall element or basically also as a separate element which is connected directly or indirectly to the upper element. As a result, the accommodating region can advantageously be implemented downward.

Furthermore, it is proposed that the upper and the lower wall element are implemented integrally. "Implemented integrally" is intended to be understood as meaning in particular connected at least in an integrally bonded manner, for example by a welding process, an adhesive bonding process, an injection molding process and/or another process appearing expedient to a person skilled in the art, and/or advantageously implemented in one piece, such as, for example, by production from a casting and/or by production in a single- or multi-component injection molding method, from an individual blank or, advantageously, by a method for producing a fiber composite material. As a result, the wall elements of the seat bottom unit may be implemented particularly advantageously.

It is furthermore proposed that the seat bottom unit has at least one side wall element, which delimits the accommodating region. A "side wall element" is intended to be understood here as meaning in particular a wall element which laterally delimits the accommodating region in a horizontal plane, i.e. in particular in a transverse direction and rearward in a seating direction. The side wall elements are preferably implemented integrally here with the upper wall element and/or the lower wall element. As a result, the accommodating region can be implemented particularly simply.

It is furthermore proposed that the accommodating region is implemented to be at least substantially closed except for a removal opening. A "removal opening" is intended to be understood here as meaning in particular an opening in the wall elements and/or side wall elements of the seat bottom unit, through which an interior of the accommodating region is connected to a surrounding area, wherein elements and modules, in particular the lifejacket module, can be introduced into or removed from the accommodating region through the removal opening. A passenger, in particular while sitting on the aircraft seat, the seat bottom of which is at least partially formed by the seat bottom unit, can remove the lifejacket module arranged in the accommodating region through the removal opening. "At least substantially closed" is intended to be understood here as meaning in particular that the walls and/or the side walls which delimit the accommodating region are preferably implemented continuously except for the removal opening and in particular do not have any further openings, wherein it is basically also conceivable, however, for recesses, through which the accommodating region, additionally to the removal opening, is at least partially open outward, to be arranged in one of the walls and/or the side walls, for example for reducing the weight of the seat bottom unit. As a result, the accommodating region can be implemented particularly advantageously and the seat bottom unit in particular rigidly.

Furthermore, it is proposed that at least a large portion of at least the upper and/or the lower wall element has a thin wall thickness. A "thin wall thickness" is intended to be understood here as meaning in particular that a thickness of the wall elements comprises less than 20 mm, preferably less than 15 mm and, in a particularly advantageous refinement, less than 10 mm. "A large portion" is intended to be understood here as meaning in particular that the wall elements have a correspondingly thin wall thickness at least in more than 50% of their surface, wherein the wall elements advantageously have a thin wall thickness at least in 75% and, in a particularly advantageous refinement, in more than 85% of their surface. In principle, it is conceivable for the wall elements to have a thicker wall thickness in regions subjected to a heavy load. In particular, it is conceivable that the wall elements and/or the side wall elements have slightly varying wall thicknesses at various points over their extent. The wall thickness of the wall elements does not have to be constant. As a result, the seat bottom unit can be implemented particularly advantageously to be lightweight.

In addition, it is proposed that the upper and/or the lower wall element are/is at least partially implemented from a plastic, in particular a composite material. A "composite material" is intended to be understood here as meaning in particular a fiber composite material. A "fiber composite material" is intended to be understood here as meaning in particular a multiphase material which comprises at least two main components and which has at least one embedding matrix and reinforcing fibers. The embedding matrix can preferably be implemented from a plastic, a resin and/or a further material appearing expedient to a person skilled in the art, and the fibers can be implemented from plastics fibers, glass fibers, carbon fibers, natural fibers and/or other fibers appearing expedient to a person skilled in the art. In principle, it is also conceivable for the wall elements to be implemented from a different material, such as, for example, from a metal sheet, such as, for example, from aluminum. As a result, the wall elements and in particular the seat bottom unit can be implemented particularly advantageously.

It is furthermore proposed that the upper wall element forms an elevated portion of the seat bottom unit. An "elevated portion of the seat bottom unit" is to mean here in particular that an upper side of the seat bottom unit is elevated from the upper wall element in contrast to a remaining portion of the upper side, i.e. has a greater distance from the mounting plane than the remaining portion of the upper side. The elevation by way of the upper wall element is preferably arranged centrally in the transverse direction of the seat bottom unit here. The seat bottom unit here is of substantially symmetrical design with respect to a center axis running in the seating direction. As a result, the accommodating region can be implemented particularly advantageously.

In addition, it is proposed that the seat bottom unit has a removal opening for removing the module from the accommodating region, said removal opening being at least partially arranged between the upper wall element and a carrier accommodation of the seat bottom unit. A "carrier accommodation" is intended to be understood here as meaning in particular a region in which a supporting tube of a mounting unit of the aircraft seat is accommodated and is fixedly connectable to the seat bottom unit. A carrier accommodation region runs here in a transverse direction and is arranged on an underside of the seat bottom unit. The seat bottom unit preferably has here a front carrier accommodation for fixed connection of the seat bottom unit to a front supporting tube, and a rear carrier accommodation for fixed connection of the seat bottom unit to a rear supporting tube. The front carrier accommodation and the rear carrier accommodation are arranged here spaced apart from each other in the seating direction of the aircraft seat. As a result, the removal opening for the accommodating region can be placed particularly advantageously.

Furthermore, it is proposed that the accommodating region is at least substantially arranged between a front and a rear carrier accommodation of the seat bottom unit. As a result, the accommodating region can be particularly advantageously arranged in the aircraft seat.

Furthermore, it is proposed that the seat bottom unit is configured at least to be adjusted between a sitting position and a comfort position. A "sitting position" is intended to be understood here as meaning in particular a first position of the seat bottom unit with respect to the mounting unit, wherein the seat bottom here preferably encloses an angle of approximately 3 degrees with the mounting plane. The sitting position here is preferably implemented as a TTL position, which is an upright position of the aircraft seat. A "comfort position" is intended to be understood here as meaning in particular a position of the seat bottom unit, in which the latter is moved out of the sitting position and encloses a different angle with the mounting plane. The comfort position here preferably forms a rearwardly tilted position of the aircraft seat. As a result, it is particularly advantageously possible to provide an aircraft seat which has a module which is particularly advantageously accessible, such as, in particular, the lifejacket module, and is likewise adjustable between two positions, as a result of which a particularly high degree of comfort can be achieved.

Furthermore, it is proposed that the accommodating region is implemented substantially obliquely at least in a seating direction. "Substantially obliquely in a seating direction" is intended to be understood here as meaning in particular that the accommodating region has different heights in its course parallel to the seating direction. The accommodating region here, in particular in a rear region which faces the rear supporting tube, is at a smaller distance from the mounting plane than at its front end at which the removal opening is arranged. As a result, the accommodating region can be implemented particularly advantageously, and therefore the module, in particular the lifejacket module, can easily be removed from the accommodating region.

Furthermore, it is proposed that the seating device has at least one closure element which is configured to at least substantially close the accommodating region in at least one operating state. A "closure element" is intended to be understood here as meaning in particular an element which, in at least one operating state, closes the removal opening of the accommodating region and therefore substantially completely closes the accommodating region outward. The comfort element, when attached to the seat bottom unit, has, in the region of the removal opening, a recess through which the removal opening and therefore the accommodating region are accessible from the outside, wherein the closure element closes said recess in at least one operating state. The closure element is connected here preferably in a pivotable manner to the seat bottom unit. The closure element here is preferably implemented by a transparent element, and therefore it is possible to look into the accommodating region from the outside in a closed state. For example, the closure element can be implemented by a transparent plastics element. In principle, however, it is also conceivable for the closure element to be at least partially implemented integrally with the comfort element and to be able to be pivoted out of the recess in order to release the removal opening or to be able to be separated from the comfort element. In an unopened state, the closure element is preferably sealed by means of a seal, and therefore it can be checked by means of a simple sight check whether the module arranged in the accommodating region is undamaged. As a result, the accommodating region and the removal opening, in particular in a normal operating state in which the lifejacket module is not used, can be covered in a manner which is not annoying for a passenger.

The seating device according to the invention is not intended to be limited here to the above-described application and embodiment. In particular, in order to carry out an operation described herein, the seating device according to the invention can have a number of individual elements, components and units differing from a number thereof referred to here.

DRAWINGS

Further advantages emerge from the description below of the drawings. The drawings illustrate an exemplary embodiment of the invention. The drawings, the description and the claims contain numerous features in combination. A person skilled in the art will expediently also consider the features individually and combine them into meaningful further combinations.

Figure 2:
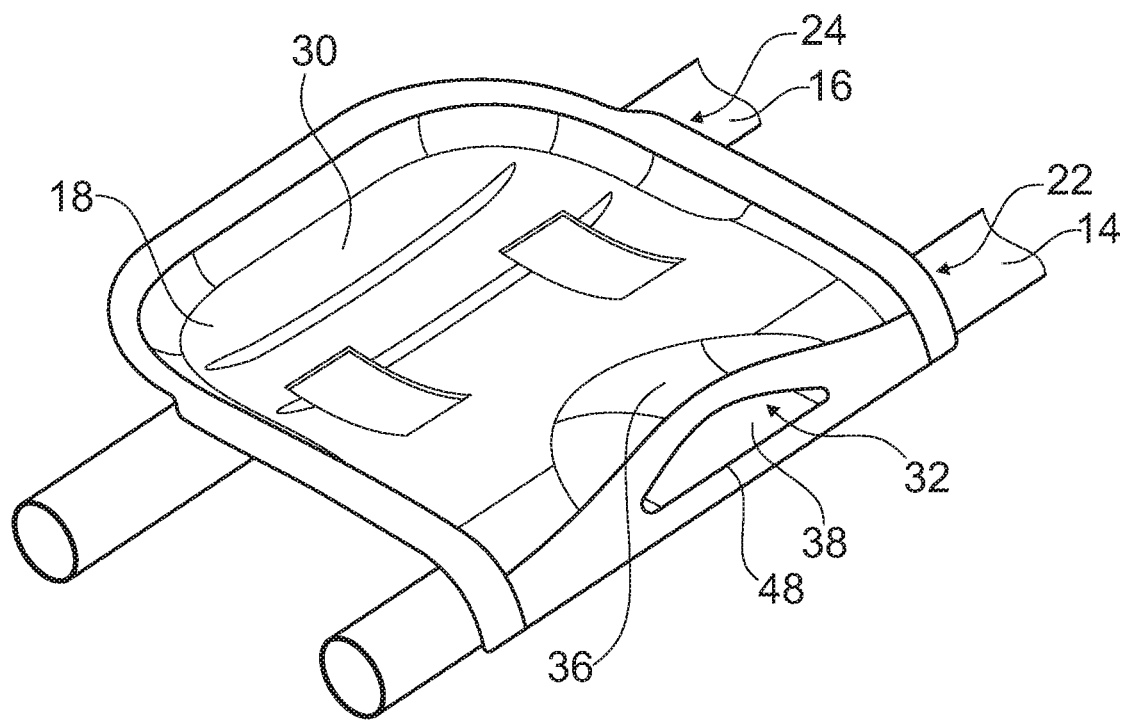
Figure 3:
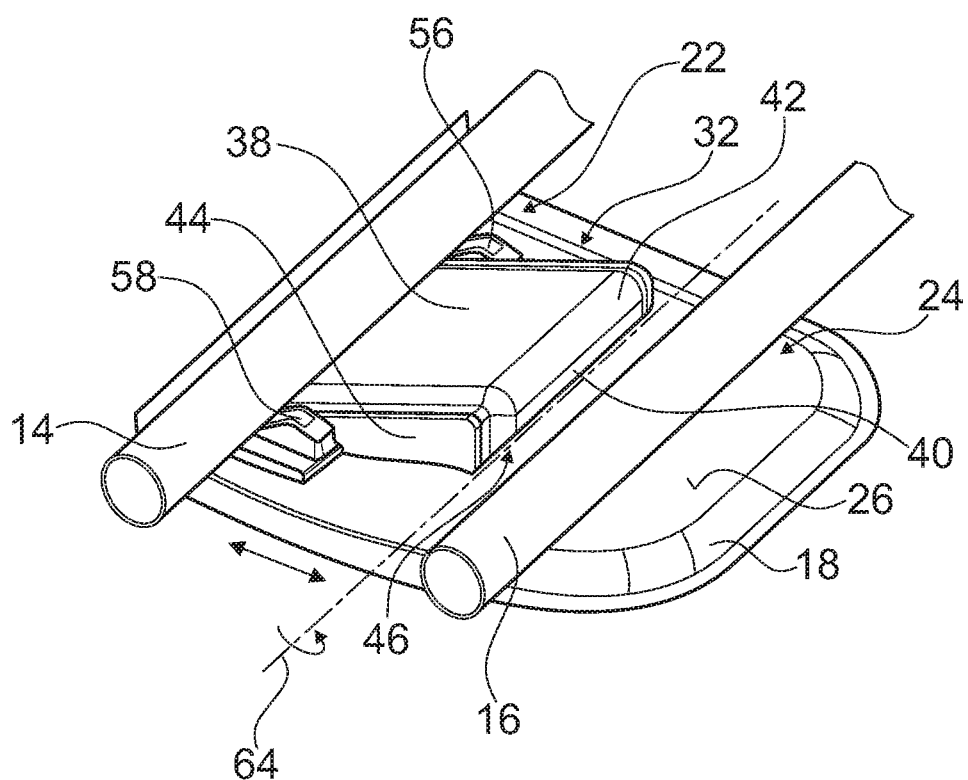
Figure 4:
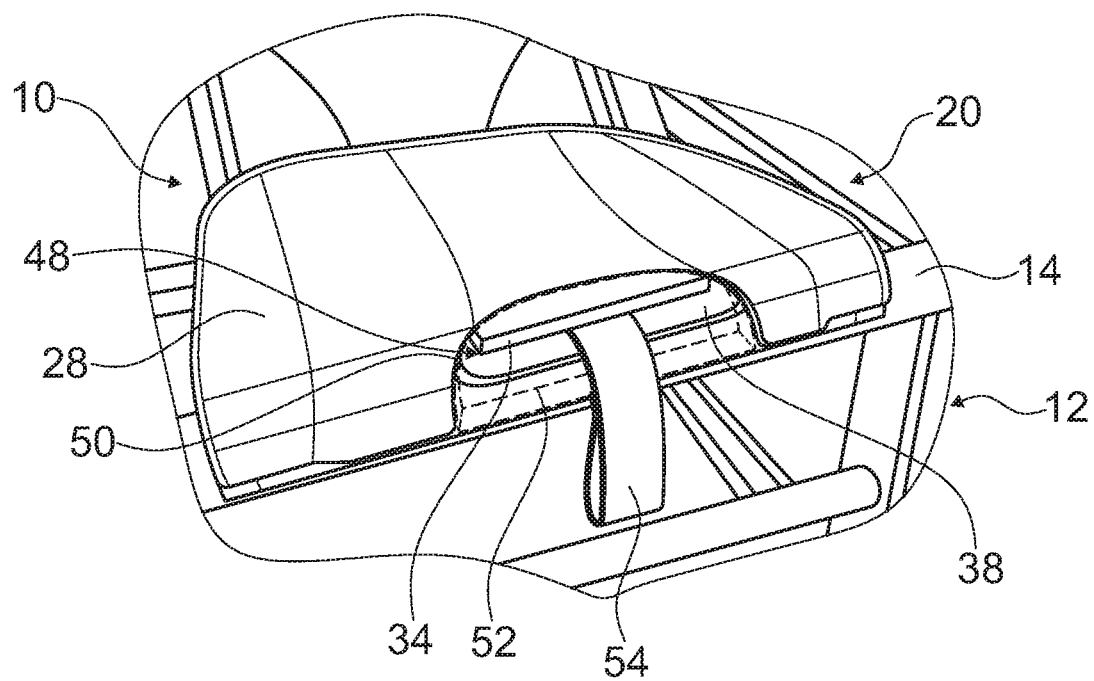
Figure 5:
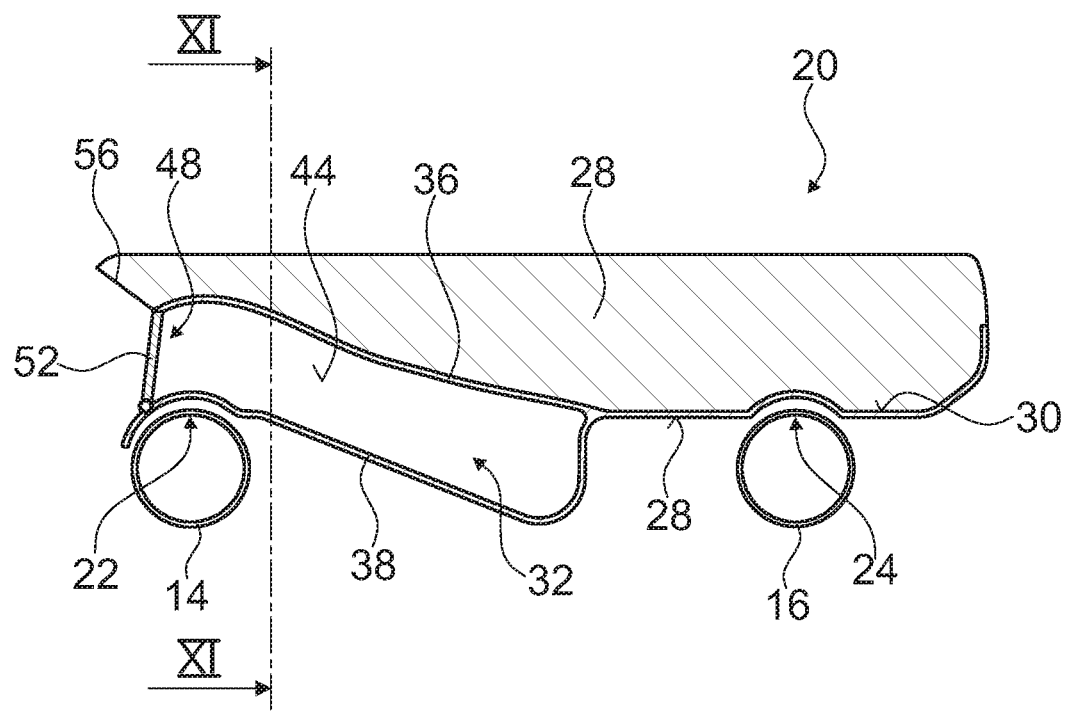
Figure 6:
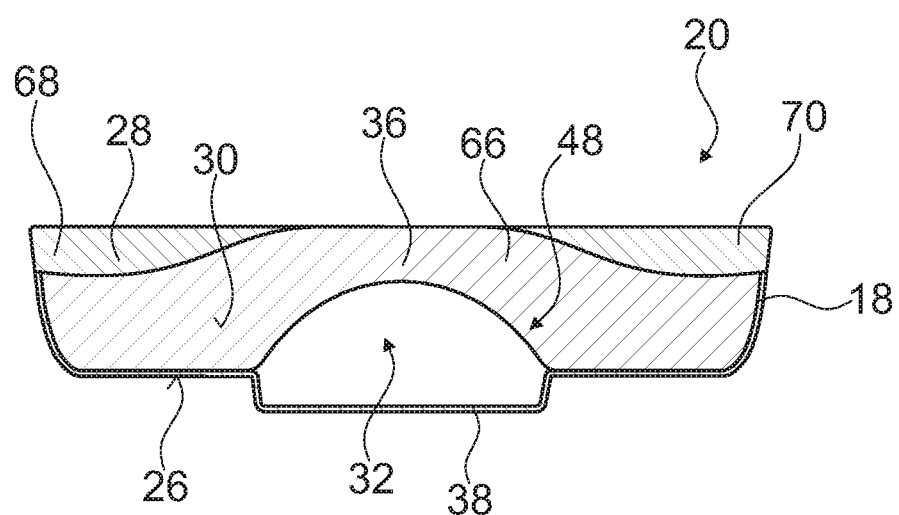

In the drawings:

FIG. 1 shows a schematic illustration of a seating device according to the invention comprising a seat bottom unit, an accommodating region and a lifejacket module, FIG. 2 shows a further schematic view of the seat bottom unit from above, FIG. 3 shows a further schematic view of the seat bottom unit from below, FIG. 4 shows a schematic view of the seat bottom unit comprising a comfort element and an indicated closure element, FIG. 5 shows a sectional view through the seat bottom unit and the comfort element, and FIG. 6 shows a front view of the seat bottom unit comprising the comfort element.

DESCRIPTION OF THE EXEMPLARY EMBODIMENT

FIGS. 1 to 6 show a refinement according to the invention of a seating device. The seating device here is implemented in particular as an aircraft seating device. The seating device is implemented as part of a seat. The seating device is implemented in particular as part of an aircraft seat 10. It is conceivable here for the aircraft seat 10 to be part of a seat row (not illustrated specifically). In a fitted state, the aircraft seat 10 is mounted in an aircraft cabin (not illustrated specifically) of an aircraft. For the mounting, the aircraft cabin preferably has two fastening rails which run parallel and via which the aircraft seat 10 can be fixedly connected to the cabin floor. In the aircraft, the cabin floor forms a mounting plane on which the aircraft seat 10 can be mounted. The aircraft seat 10 comprises a mounting unit 12 via which the aircraft seat 10 is mounted on the cabin floor. The mounting unit 12 comprises at least seat feet (not illustrated specifically) via which the aircraft seat 10 is mounted on the cabin floor. The mounting unit 12 of the aircraft seat 10 comprises a front supporting tube 14 and a rear supporting tube 16. The supporting tubes 14, 16 form a supporting structure of the aircraft seat 10. The supporting tubes 14, 16 run in the transverse direction of the aircraft seat 10, the transverse direction being oriented orthogonally to a seating direction of the aircraft seat 10. If the aircraft seat 10 is part of a seat row, the supporting tubes 14, 16 are also part of a supporting structure of the further aircraft seats of the seat row. The supporting tubes 14, 16 have an annular cross section. The supporting tubes 14, 16 are of thin-walled design here.

The seating device has a seat bottom unit 18. The seat bottom unit 18 is implemented as an aircraft seat bottom unit. The seat bottom unit 18 forms part of a seat bottom 20 of the aircraft seat 10. The seat bottom unit 18 forms a basic structure of the seat bottom 20. The seat bottom unit 18 in particular forms a supporting structure of the seat bottom 20. The seat bottom unit 18 is implemented from a fiber composite material. The seat bottom unit 18 is implemented by a plurality of layers of fiber-reinforced plastics plates. The fiber-reinforced plastics plates are connected to one another in an integrally bonded manner here in a production process. After the production process, the fiber-reinforced plastics plates integrally form the seat bottom unit 18. In principle, it is also conceivable for the seat bottom unit 18 to be implemented from an upper plate and a lower plate which are connected to one another in a form-fitting, force-fitting and/or integrally bonded manner at least in partial regions. The seat bottom unit 18 forms a stiff unit. Forces which act on the seat bottom 20 of the aircraft seat 10 during use are introduced into the mounting unit 12 via the seat bottom unit 18. For the coupling to the mounting unit 12, the seat bottom unit 18 has a front carrier accommodation 22 and a rear carrier accommodation 24. The carrier accommodations 22, 24 are implemented by an underside 26 of the seat bottom unit 18. The seat bottom unit 18 is indirectly connectable to the supporting tubes 14, 16 of the mounting unit 12 via the carrier accommodations 22, 24. The front supporting tube 14 is assigned here to the front carrier accommodation 22. In the fitted state, the front supporting tube 14 is arranged in the carrier accommodation 22. The rear supporting tube 16 is assigned to the rear carrier accommodation 24. In the fitted state, the rear supporting tube 16 is arranged in the rear carrier accommodation 24. The aircraft seat 10 comprises a plurality of connecting elements via which the supporting tubes 14, 16 are coupled fixedly in the corresponding carrier accommodations 22, 24 to the seat bottom unit 18. The carrier accommodations 22, 24 are arranged spaced apart from each other in a seating direction of the aircraft seat 10. The front carrier accommodation 22 has two connecting elements 56, 58 which are implemented fixedly with the seat bottom unit 18. Via the two connecting elements 56, 58, the seat bottom unit 18 is connected displaceably to the supporting tubes 14, 16 by clips (not illustrated specifically). Via the connection of the front supporting tube 14 to the seat bottom unit 18 via the connecting elements 56, 58 and the clips (not illustrated specifically), the seat bottom unit 18 can be adjusted with respect to the front supporting tube 14. As a result, adjustment of the aircraft seat 10 between a sitting position and a comfort position is possible. In particular, the back rest and the seat bottom unit 18 can be adjusted between a sitting position and a comfort position. The sitting position is implemented here as a TTL position. The seat bottom unit 18 has a torsion tube (not illustrated specifically) and/or a mechanism. The torsion tube is coupled to the seat bottom unit 18 via the mechanism. The torsion tube is connected here to seat dividers of the aircraft seat 10. The seat bottom unit 18 is adjustable between the sitting position and the comfort position via the torsion tube and the mechanism. The torsion tube is illustrated schematically here by way of an indicated axis of rotation 64. During an adjustment of the seat bottom unit 18 between the sitting position and the comfort position, the seat bottom unit 18 is rotated with respect to the axis of rotation 64 and moved axially in the seating direction.

In principle, it would also be conceivable for the seat bottom unit 18 to be attached fixedly to the supporting tubes 14, 16 and not to be adjustable between a sitting position and a comfort position. The seat bottom unit 18 could be coupled here both directly to the supporting tubes 14, 16 and also indirectly via fastening elements (not explained specifically). The seat bottom unit 18 here would have, for example, the clips, via which the seat bottom unit 18 would be directly connected to the supporting tube 16 and fastened axially thereon.

The seating device comprises a comfort element 28. The comfort element 28 is configured to form the one seat region of the seat bottom 20. The comfort element 28 is implemented from a foam. In principle, it is also conceivable for the comfort element 28 to be implemented of layers of a plurality of different cushions. In a fitted state, the comfort element 28 is arranged on an upper side 30 of the seat bottom unit 18. The comfort element 28 is connected fixedly here to the upper side 30 of the seat bottom unit 18. The upper side 30 of the seat bottom unit 18 forms a support surface for the comfort element 28. For this purpose, a plurality of connecting elements (not illustrated specifically) are attached to the upper side 30 of the seat bottom unit 18. On its underside facing the seat bottom unit 18 in the fitted state, the comfort element 28 has correspondingly embodied connecting elements. The connecting elements here are implemented as loop or hook straps which are embodied correspondingly to one another. It is basically also conceivable for the connecting elements to be implemented in a different manner deemed expedient by a person skilled in the art, such as, for example, as press studs or differently implemented form-fitting and/or force-fitting elements. The comfort element 28 is implemented here from different foams. In a rear region, the comfort element 28 has a harder foam than in a front region. In particular, the comfort element 28 has a first central foam region 66 which is implemented from a harder foam than two side foam regions 68, 70. The central foam region 66 here forms a basic structure of the comfort element 28 and in particular forms a lower part of the comfort element 28 and centrally, in a region of an accommodating region 32, an upper region. The central foam region 66 here forms the seat surface centrally. In a front region of the comfort element 28, the side foam regions 68, 70 are implemented in an upper region in the sides of the central foam region 66. The side foam regions 68, 70 are implemented from a flexible foam. As a result, the lateral regions of the comfort element 28, in which thighs of a passenger sitting on the aircraft seat rest, can be particularly advantageously upholstered. As a result, comfort of the seat bottom 20 can be advantageously increased. The different foams forming the comfort element 28 are connected fixedly to one another here. By means of the foams of differing strength, the comfort element 28 may be particularly advantageously realized in a stable and comfortable manner. Of course, it is also conceivable, in principle, for the comfort element 28 to be embodied merely of one foam having a constant hardness, or for the comfort element 28 to be implemented from more than two foams of differing hardness which form zones of differing hardness of the comfort element 28.

The seat bottom unit 18 comprises an accommodating region 32. The accommodating region 32 is arranged centrally in the seat bottom unit 18, as seen in the transverse direction. A first lateral end of the accommodating region 32 is at a distance here from a first side of the seat bottom unit 18, which distance is the same size as a distance of the second lateral end of the accommodating region 32 from a second side of the seat bottom unit 18. As seen in the seating direction of the aircraft seat 10, the accommodating region 32 extends from a front region of the seat bottom unit 18 into a central region of the seat bottom unit 18. The accommodating region 32 extends here above the front supporting tube 14. The accommodating region 32 is for the most part arranged between the front carrier accommodation 22 and the rear carrier accommodation 24. In a fitted state, a large part of the accommodating region 32 extends between the front supporting tube 14 and the rear supporting tube 16 of the mounting unit 12 of the aircraft seat 10. A large part of the accommodating region 32 is arranged in a horizontal plane between the two supporting tubes 14, 16 here. The accommodating region 32 is arranged obliquely, as seen in the seating direction. The accommodating region 32 extends away from a rear, lower region upward from the mounting plane in the direction of the front end here. In the rear region, the accommodating region 32 is arranged approximately level with the supporting tubes 14, 16. At the front region, the accommodating region 32 is arranged above the supporting tubes 14, 16 with respect to the mounting plane. By means of the oblique course of the accommodating region 32, a particularly advantageous removal direction can be achieved, through which the module, in particular the lifejacket module 34, can be pulled out of the accommodating region 32 particularly simply.

The accommodating region 32 is configured for receiving a module. In particular, the accommodating region 32 is configured for receiving a lifejacket module 34. The lifejacket module 34 comprises at least one lifejacket, a container in which the lifejacket is securely arranged, and a pulling element 54, at which the lifejacket module 34 can be pulled out of the accommodating region 32 by a passenger. The pulling element 54 is fixedly connected to the lifejacket module 34. The pulling element 54 is implemented here as a strap. The pulling element 54 is implemented here as a wide strap which can easily be grasped by a passenger. In principle, it is also conceivable for the pulling element 54 to have a holding assistance means, for example a loop or a gripping hook. It is also conceivable, in principle, for the pulling element 54 to be implemented in another manner deemed expedient by a person skilled in the art. It is also conceivable in principle here for the lifejacket module 34 to be embodied in a different manner and, for example, not to have a container. In principle, it is also conceivable for the module arranged in the accommodating region 32 to be implemented as a different module appearing expedient to a person skilled in the art, for example as a stowage module, in which utensils can be stowed.

The seat bottom unit 18 has an upper wall element 36. The upper wall element 36 delimits the accommodating region 32 in the direction of the upper side 30 of the seat bottom unit 18. The upper wall element 36 is at least partially identical to the upper side 30 of the seat bottom unit 18. The upper wall element 36 forms at least part of the support surface for the comfort element 28 here. The accommodating region 32 is delimited by the upper wall element 36 in the direction of the upper side 30. The upper wall element 36 forms an elevated portion of the seat bottom unit 18. The upper wall element 36 here forms the elevated portion in particular in the front region of the accommodating region 32. In the fitted state of the seat bottom unit 18, the wall element 36 is at a greater distance from the mounting plane in a front region facing the front end of the seat bottom unit 18 than in a rear region facing the rear end of the seat bottom unit 18. In the rear region, the upper wall element 36 substantially forms one plane with a rest of the upper side 30 in the rear region.

The seat bottom unit 18 has a lower wall element 38. The accommodating region 32 is delimited by the lower wall element 38 in the direction of the mounting plane. The lower wall element 38 is arranged at a distance from the upper wall element 36. The upper wall element 36 and the lower wall element 38 delimit the accommodating region 32 in the vertical direction. The accommodating region 32 has a largest vertical extent at a rear end 46. At the rear end 46 of the accommodating region 32, which end faces the rear supporting tube 16, the upper wall element 36 and the lower wall element 38 are at a maximum distance from each other. At the rear end 46, the lower wall element 38 is at a smaller distance from the mounting plane than the rear supporting tube 16. The rear end 46 of the accommodating region 32 projects into a region below the supporting tubes 14, 16. The rear end 46 is arranged on a side of the rear supporting tube 16 that faces the front supporting tube 14. From the rear end 46, the lower wall element 38 runs obliquely upward in the direction of the front supporting tube 16. The lower wall element 38 is arranged in its front region above the front supporting tube 14. The seat bottom unit 18 has three side wall elements 40, 42, 44, which delimit the accommodating region 32 in a horizontal plane in three directions. The first side wall element 40 is implemented as a back wall. The first side wall element 40 delimits the accommodating region 32 rearward. The first side wall element 40 forms the rear end 46 of the accommodating region 32. The first side wall element 40 faces the rear supporting tube 16. The two side wall elements 42, 44 each delimit the accommodating region 32 laterally. The two side wall elements 42, 44 run substantially parallel to the seating direction of the aircraft seat 10 here. In principle, it is also conceivable for the two side wall elements 42, 44 to run tilted with respect to the seating direction of the aircraft seat 10. The two side wall elements 42, 44 are implemented obliquely and, at their rear sides facing the first side wall element 40, which is implemented as a back wall, are at a smaller distance from the mounting plane than at their front sides. The side wall elements 42, 42 extend further away from the underside 26 of the seat bottom unit 18 at their rear sides than at their front sides.

The upper wall element 36 and the lower wall element 38 are implemented integrally with each other. The wall elements 36, 38 and the side wall elements 40, 42, 44 are implemented integrally with one another. The wall elements 36, 38 and the side wall elements 40, 42, 44 have a thin wall thickness. The wall thickness of the wall elements 36, 38 and of the side wall elements 40, 42, 44 is smaller here than 10 mm. The upper wall element 36 and the lower wall element 38 are produced from a plastic, in particular a fiber composite material. The side wall elements 40, 42, 44 are likewise implemented from a fiber composite material. The wall elements 36, 38 and the side wall elements 40, 42, 44 are implemented integrally with the entire seat bottom unit 18. The wall elements 36, 38 and the side wall elements 40, 42, 44 are implemented together with the seat bottom unit 18 from the fiber composite material. The wall elements 36, 38 and the rest of the seat bottom unit 18 are produced together here in a production process from a fiber composite material. In principle, it would also be conceivable for at least parts of the wall elements 36, 38 or of the side wall elements 40, 42, 44 to be designed as separately implemented individual parts which are fixedly connected in an assembly with the rest of the seat bottom unit 18 in a manner appearing expedient to a person skilled in the art, for example by adhesive bonding or screwing.

The accommodating region 32 has a removal opening 48. The removal opening 48 is configured such that a module, in particular the lifejacket module 34, can be introduced into and removed again from the accommodating region 32. A passenger can remove the lifejacket module 34 from the accommodating region 32 via the removal opening 48. The passenger can remove the lifejacket module 34, in particular while said passenger is sitting on the aircraft seat 10, from the accommodating region 32 via the removal opening 48 here. The accommodating region 32 is closed apart from the removal opening 48. The accommodating region 32 is completely surrounded here by the wall elements 36, 38 and the side wall elements 40, 42, 44 apart from the removal opening 48. The wall elements 36, 38 and the side wall elements 40, 42, 44 are implemented for this purpose as continuous elements. The wall elements 36, 38 and the side wall elements 40, 42, 44 do not have any through recesses. As a result, a particularly stable and torsionally rigid seat bottom unit 18 can be achieved. In principle, however, it is also conceivable for the wall elements 36, 38 and/or the side wall elements 40, 42, 44 to at least partially have recesses or through recesses, by means of which weight can be saved and, as a result, a particularly lightweight seat bottom unit 18 can be rendered available. The removal opening 48 is arranged between the upper wall element 36 and the carrier accommodation 22 of the seat bottom unit 18 for the front supporting tube 14. In a fitted state, the removal opening 48 is at least partially arranged above the front supporting tube 14. The term "above" is intended to be understood here as meaning in particular further removed from the mounting plane.

The comfort element 28, which is fastened to the upper side 30 of the seat bottom unit 18, has a recess 50 in the region of the removal opening 48. The recess 50 has substantially an identical shape to the removal opening 48. In a correctly fitted state, the recess 50 of the comfort element 28 is aligned congruently with the removal opening 48. In the correctly fitted state, the recess 50 of the comfort element 28 is arranged above the removal opening 48. The lifejacket module 34 can be removed from the accommodating region 32 through the removal opening 48 and the recess 50 in the comfort element 28. In order to close the recess 50 and therefore the removal opening 48 in a normal operating state of the aircraft seat 10, the seat bottom unit 18 has a closure element 52. In a normal operating state, the closure element 52 is arranged in the recess 50 and, as a result, closes the latter. The closure element 52 here is substantially implemented from a transparent plastic. The closure element 52 is connected pivotably to the seat bottom unit 18. The closure element 52 is connected to the seat bottom unit 18 in an articulated manner via a pivot bearing. The pivot bearing connects the closure element 52 to the lower wall element 38. As a result, the closure element 52 can be pivoted in order to release the recess 50 and therefore the removal opening 48 of the accommodating region 32. The closure element 52 comprises at least one elastic element which is configured to exert a closing force on the closure element 52. The elastic element is preferably implemented here by a rubber element. In principle, it is also conceivable for the elastic element to be implemented as another spring-elastic element appearing expedient to a person skilled in the art. The elastic element keeps the closure element 52 in its closed position here. Furthermore, after the opening of the closure element 52, the elastic element exerts a closing force on the closure element 52 such that the latter can be automatically closed again. As a result, after the lifejacket module 34 has been removed, the accommodating region 32 can advantageously be closed automatically again. In principle, it is also conceivable for the closure element 52 to be connected to the seat bottom unit 18 in a manner such that it can be torn off or to be connected to the comfort element 28 merely via force-fitting and/or form-fitting elements. In the normal operating state, the closure element 52 is arranged captively in the recess 50. It is conceivable here for the closure element 52 and the comfort element 28 and/or the seat bottom unit 18, in the region of the recess 50, to have mutually correspondingly designed force-fitting and/or form-fitting elements, via which the closure element 52 is connectable to the comfort element 28 or to the seat bottom unit 18. The seat bottom unit 18 here has a seal (not illustrated specifically) which seals the closure element 52 such that it can easily be determined if the closure element 52 has already been opened.

In the normal operating state, the lifejacket module 34 is arranged in the accommodating region 32, and the removal opening 48 is closed by the closure element 52. The pulling element 54 of the lifejacket module 34 projects here from the removal opening 48 out of the accommodating region 32 and is guided through a region between the closure element 52 and the seat bottom unit 18 until under the seat bottom unit 18. The pulling element 54 can simply be grasped there by a passenger sitting on the aircraft seat 10. In an emergency, the passenger can simply grasp the pulling element 54, which is located under the seat bottom 20, of the lifejacket module 34. By pulling on the pulling element 54, the lifejacket module 34 is pulled out of the accommodating region 32 through the removal opening 48. In the process, the lifejacket module 34 pushes the closure element 52 which, by means of its pivotable mounting, springs out of the recess 50 of the comfort element 28. As a result, the lifejacket module 34 can be pulled out of the accommodating region 32 through the removal opening 48 and the recess 50 of the comfort element 28.

REFERENCE SIGNS 10 aircraft seat
12 mounting unit
14 supporting tube
16 supporting tube
18 seat bottom unit
20 seat bottom
22 carrier accommodation
24 carrier accommodation
26 underside
28 comfort element
30 upper side
32 accommodating region
34 lifejacket module
36 upper wall element
38 lower wall element
40 side wall element
42 side wall element
44 side wall element
46 rear end
48 removal opening
50 recess
52 closure element
54 pulling element
56 connecting element
58 connecting element
64 axis of rotation
66 central foam region
68 side foam region
70 side foam region

The invention claimed is:

1. A seating device comprising
an aircraft seat bottom unit having:
   an accommodating region that receives a lifejacket module, the accommodating region having at least one upper wall element which forms at least a support surface for a separate comfort element of a seat; and
   a removal opening for removing the life jacket module from the accommodating region, the removal opening being at least partially arranged directly vertically between the upper wall element and a carrier accommodation of the seat bottom unit.

2. The seating device as claimed in claim 1, wherein the seat bottom unit has at least one lower wall element which downwardly delimits the accommodating region.

3. The seating device as claimed in claim 2, wherein the upper wall element and the lower wall element are implemented integrally.

4. The seating device as claimed in claim 1, wherein the seat bottom unit has at least one side wall element, which delimits the accommodating region.

5. The seating device as claimed in claim 1, wherein the accommodating region is implemented to be at least substantially closed except for a removal opening.

6. The seating device as claimed in claim 2, wherein a thickness of at least the upper and/or the lower wall element is less than 20 mm in at least 50% of a surface of the at least upper and/or the lower wall element.

7. The seating device as claimed in claim 1, wherein the upper wall element forms an elevated portion of the seat bottom unit.

8. The seating device as claimed in claim 1, wherein the accommodating region is at least substantially arranged between a front and a rear carrier accommodation of the seat bottom unit.

9. The seating device as claimed in claim 1, wherein the seat bottom unit is configured at least to be adjusted between a sitting position and a comfort position.

10. The seating device as claimed in claim 1, wherein the accommodating region is implemented substantially obliquely at least in a seating direction.

11. The seating device as claimed in claim 1, comprising at least one closure element, which is configured to at least substantially close the accommodating region in at least one operating state.

12. An aircraft seat, comprising a seating device as claimed in claim 1.

13. A seating device comprising
an aircraft seat bottom unit having an accommodating region that receives a lifejacket module,
the accommodating region having at least one upper wall element which forms at least a support surface for a separate comfort element of a seat,
as seen in a seating direction of the aircraft seat, the accommodating region extending from a front region of the seat bottom unit into a central region of the seat bottom unit, and
the accommodating region extending above a front supporting tube.

14. A seating device comprising
an aircraft seat bottom unit having an accommodating region that receives a lifejacket module,
the accommodating region having at least one upper wall element which forms at least a support surface for a comfort element,
the accommodating region being arranged obliquely as seen from a seating direction, and
the accommodating region extending away from a rear, lower region upward from a mounting plane in the direction of a front end.

* * * * *